UNITED STATES PATENT OFFICE.

BERTRAND S. SUMMERS, OF PORT HURON, MICHIGAN.

FOOD PRODUCT AND METHOD OF MAKING THE SAME.

949,029.

Specification of Letters Patent. Patented Feb. 15, 1910.

No Drawing. Application filed October 12, 1907. Serial No. 397,077.

*To all whom it may concern:*

Be it known that I, BERTRAND S. SUMMERS, a citizen of the United States, residing at Port Huron, St. Clair county, Michigan, have invented a new and useful Food Product and Method of Preparing the Same, of which the following is a specification.

My invention has relation to food products for domestic animals and the object thereof is to provide such a food by utilizing the natural products of the flax plant which have heretofore gone to waste or have been sold at such a low market value as to make them practically waste material. These products which I thus employ for the preparation or production of my product comprise the parts of the green or unretted flax plant remaining after the removal of the fibrous portion of the plant, which products I treat in the manner hereinafter described to form my new food product. In the practice of my invention I employ the flax plant in its unretted or so-called green condition, by which is meant that the straw coming to maturity and having been harvested has received only field curing, or sun drying, as is the case when the flax plant is grown for seed only. I have found that the flax plant which is most suitable for producing unretted fiber yields approximately as follows: about 20% fiber, 40% shive, 20% seed, 15% chaff and leaves and 5% cuticle or dust, and while these proportions vary considerably in different flax plants, they do not vary sufficiently beyond limits which will yield a good stock food when they are combined in the proportions natural to the plant.

Referring to the preferred method of preparing my new food product, I take the field-cured straw with the seed on and subject it to any suitable process for removing the fiber, such as the process set forth in my prior patent No. 815,876, according to which the straw in its unretted or green condition is subjected to a prolonged artificial refrigeration before being broken and cleaned in the cleaning device or machine. The cleaning machine which I employ for the purpose of cleaning and removing the fiber comprises a breaking device whereby the woody portions of the straw are broken and partially separated from the fiber and the seed is removed, and a scutching device whereby the fiber is scutched or beaten to remove from the fiber all the woody portions, seed, etc., which is not removed by the breaking device. It is the residue of the straw remaining after such separation and cleaning of the fiber that I employ for my food product, such residue consisting of the woody portions of the straw, the seed, the chaff, leaves, cuticle, etc. After the fiber is thus separated or removed this residue is then put through a suitable grinder until it is ground to sufficient fineness for a food which is seldom coarser than 22 mesh and usually much finer. The resulting mass is then gently heated until it is fairly warm and is thereupon put under a suitable press and pressed into a cake. As a result of this treatment or process the oil from the ground seed is forced throughout the entire mass, thus giving the different constituents of the food a suitable fatty content, the fat-giving constituents harmonizing the different products into a more uniform mass. As the different parts of the flax plant possess different food values, this treatment is sufficient to supply the requirements of a first-class food.

In some cases I have found it desirable to add to the mass a small amount of adhesive material, such as thick molasses, in order to obtain a better formed cake. This addition is not intended as a food, but merely to make the mass more adhesive and to obtain a better appearing cake.

While I have described a method according to which the oil is forced from the seed portion of the plant into the other constituents, it is not an essential part of my invention in its broader aspect to press this product into a cake. Where it is desirable to sell the food in the form of a bran by suitably grinding the seed in the presence of the other constituents and bringing them all to the required fineness, sufficient oil is imparted by the seed to the other constituents in the grinding operation, if the same is properly conducted. Instead of grinding the several constituents separately, all the products of the flax plant to be utilized may be introduced into the grinding machine and ground together, more than one grinding being usually desirable. Inasmuch as considerable pressure is exerted upon the product in the grinding operation, the oil is imparted by the seed to the remainder of the food constituents.

I claim:

1. A cattle food comprising the residue of the unretted flax plant, which remains after removing the fiber by mechanical means from the unretted plant in its green condition, the seed of the plant being prepared and distributed throughout the mass to impart its oil thereto; substantially as described 2. A cattle food comprising the ground and pressed residue of the unretted flax plant, which remains after removing the fiber by mechanical means from the unretted plant in its green condition, the seed of the plant remaining in and being ground and distributed throughout the mass; substantially as described.

3. The method of preparing a cattle food which consists in mixing the different ingredients forming the residue of unretted flax plant, which remains after removing the fiber by mechanical means from the unretted plant in its green condition, grinding such residue together with the seed to suitable fineness to cause the seed to impart its oil to the mass and pressing it to form a cake; substantially as described.

4. The method of preparing a cattle food which consists in mixing the different ingredients forming the residue of the unretted flax plant, which remains after removing the fiber by mechanical means from the unretted plant in its green condition, grinding the same including the seed to cause the latter to impart its oil to the mass and then subjecting it to a gentle heat, and pressing the same into a suitable cake; substantially as described.

5. The method of preparing a cattle food which consists in mixing the different ingredients forming the residue of the unretted flax plant, which remains after removing the fiber by mechanical means from the unretted plant in its green condition, grinding the same and subjecting it to a sufficient pressure to cause the oil in the seed to permeate the entire mass; substantially as described.

6. A cattle food comprising the residue of the unretted flax plant which remains after removing the fiber by mechanical means from the unretted plant in its green condition and mixed with molasses, the seed of the plant being prepared and distributed throughout the mass so as to impart its oil thereto.

BERTRAND S. SUMMERS.

Witnesses:
 THOMAS Y. WHITE,
 A. R. THOMAS.